(12) United States Patent
Brasnett

(10) Patent No.: US 11,184,509 B2
(45) Date of Patent: *Nov. 23, 2021

(54) CADENCE ANALYSIS FOR A VIDEO SIGNAL HAVING AN INTERLACED FORMAT

(71) Applicant: Imagination Technologies Limited, Kings Langley (GB)

(72) Inventor: Paul Brasnett, West Molesey (GB)

(73) Assignee: Imagination Technologies Limited, Kings Langley (GB)

( * ) Notice: Subject to any disclaimer, the term of this patent is extended or adjusted under 35 U.S.C. 154(b) by 617 days.

This patent is subject to a terminal disclaimer.

(21) Appl. No.: 15/948,053

(22) Filed: Apr. 9, 2018

(65) Prior Publication Data

US 2018/0227465 A1 Aug. 9, 2018

Related U.S. Application Data

(63) Continuation of application No. 14/702,072, filed on May 1, 2015, now Pat. No. 9,973,661.

(30) Foreign Application Priority Data

May 1, 2014 (GB) ..................................... 1407665
Apr. 22, 2015 (GB) ..................................... 1506850

(51) Int. Cl.
| | |
|---|---|
| *H04N 5/14* | (2006.01) |
| *H04N 5/06* | (2006.01) |
| *H04N 7/01* | (2006.01) |
| *H04N 7/015* | (2006.01) |
| *H04N 21/4402* | (2011.01) |

(52) U.S. Cl.
CPC .............. *H04N 5/145* (2013.01); *H04N 5/06* (2013.01); *H04N 5/142* (2013.01); *H04N 7/012* (2013.01); *H04N 7/0115* (2013.01); *H04N 21/440281* (2013.01)

(58) Field of Classification Search
CPC .......... H04N 5/145; H04N 5/06; H04N 5/142; H04N 7/012; H04N 7/0115; H04N 21/440281

See application file for complete search history.

(56) References Cited

U.S. PATENT DOCUMENTS

| | | |
|---|---|---|
| 5,563,651 A | 10/1996 | Christopher et al. |
| 6,839,094 B2 | 1/2005 | Tang et al. |
| 7,039,111 B2 | 5/2006 | Lee |
| 7,129,990 B2 | 10/2006 | Wredenhagen et al. |
| 7,154,555 B2 | 12/2006 | Conklin |

(Continued)

*Primary Examiner* — Brian P Yenke
(74) *Attorney, Agent, or Firm* — Potomac Law Group, PLLC; Vincent M DeLuca

(57) ABSTRACT

An interlaced video signal can include content of different types, such as interlaced content and progressive content. The progressive content may have different cadences according to the ratio between the frame rate of the progressive content and the field rate of the interlaced video signal. Cadence analysis is performed to identify the cadence of the video signal and/or to determine field pairings when progressive content is included. As described herein, motion information (e.g. motion vectors) for blocks of fields of a video signal can be used for the cadence analysis. The use of motion information provides a robust method of performing cadence analysis.

20 Claims, 8 Drawing Sheets

(56) References Cited

U.S. PATENT DOCUMENTS

| | | |
|---|---|---|
| 7,233,361 B2 | 6/2007 | Yang et al. |
| 7,349,029 B1 | 3/2008 | Chou |
| 7,405,766 B1 * | 7/2008 | Chou .................... H04N 5/144 |
| | | 348/448 |
| 7,446,818 B2 | 11/2008 | Chao |
| 7,667,773 B2 | 2/2010 | Han |
| 7,705,914 B2 | 4/2010 | Yamauchi |
| 7,849,350 B2 | 12/2010 | French et al. |
| 8,004,606 B2 | 8/2011 | Adams |
| 8,004,607 B2 | 8/2011 | Eymard et al. |
| 8,120,703 B2 * | 2/2012 | Adams .................. H04N 7/012 |
| | | 348/448 |
| 8,243,195 B2 | 8/2012 | Eymard et al. |
| 8,289,447 B1 * | 10/2012 | Gowri-Shankar ..... H04N 7/012 |
| | | 348/441 |
| 8,619,187 B2 * | 12/2013 | Garg .................... H04N 7/0115 |
| | | 348/441 |
| 8,625,025 B2 | 1/2014 | Lee |
| 8,861,589 B2 * | 10/2014 | Wyman ................ H04N 7/0115 |
| | | 375/240.01 |
| 8,902,358 B1 * | 12/2014 | Harris .................... H04N 7/012 |
| | | 348/419.1 |
| 9,129,655 B2 * | 9/2015 | Iyer ...................... G11B 27/034 |
| 9,131,164 B2 * | 9/2015 | Tian ...................... H04N 7/0112 |
| 9,661,261 B2 * | 5/2017 | Lin ....................... G11B 27/031 |
| 9,800,824 B2 * | 10/2017 | Davis .................... H04N 7/012 |
| 9,973,661 B2 * | 5/2018 | Brasnett ................ H04N 5/142 |
| 2004/0008275 A1 | 1/2004 | Yang et al. |
| 2004/0227852 A1 | 11/2004 | Neuman et al. |
| 2005/0062891 A1 | 3/2005 | Tang et al. |
| 2007/0002169 A1 * | 1/2007 | Munsil .................. H04N 5/147 |
| | | 348/446 |
| 2007/0052846 A1 | 3/2007 | Adams |
| 2007/0291169 A1 * | 12/2007 | Eymard ............... H04N 7/0115 |
| | | 348/452 |
| 2007/0296858 A1 | 12/2007 | Eymard et al. |
| 2007/0296870 A1 * | 12/2007 | Foret .................... H04N 5/937 |
| | | 348/701 |
| 2008/0088746 A1 | 4/2008 | Walls |
| 2008/0106642 A1 * | 5/2008 | Srinivasan ............ H04N 5/144 |
| | | 348/452 |
| 2009/0115845 A1 | 5/2009 | Walls et al. |
| 2009/0167939 A1 | 7/2009 | Yamauchi |
| 2009/0180544 A1 | 7/2009 | Nix et al. |
| 2009/0190030 A1 | 7/2009 | Nix et al. |
| 2010/0026886 A1 | 2/2010 | Sharlet et al. |
| 2010/0182401 A1 | 7/2010 | Yoon et al. |
| 2010/0253838 A1 | 10/2010 | Garg et al. |
| 2010/0309372 A1 | 12/2010 | Zhong |
| 2011/0013081 A1 * | 1/2011 | Wredenhagen ...... H04N 7/0112 |
| | | 348/449 |
| 2012/0162439 A1 | 6/2012 | Deng et al. |
| 2012/0212666 A1 | 8/2012 | Lee |
| 2012/0293700 A1 | 11/2012 | Drouin |
| 2013/0022283 A1 * | 1/2013 | Bruna Estrach ....... H04N 5/145 |
| | | 382/226 |
| 2015/0319406 A1 * | 11/2015 | Brasnett ................ H04N 7/012 |
| | | 348/448 |
| 2016/0094803 A1 * | 3/2016 | Possos .................. H04N 7/012 |
| | | 348/448 |
| 2016/0343113 A1 * | 11/2016 | Choudhury ............. G06K 9/40 |

\* cited by examiner

CADENCE ANALYSIS FOR A VIDEO SIGNAL HAVING AN INTERLACED FORMAT

BACKGROUND

Video signals may have an interlaced format comprising a sequence of fields, where each field represents a subset of the lines of a frame of video content. The video signal may include video content of different types, e.g. content which has an interlaced content type or content which has a progressive content type. The interlaced video signal includes two complementary types of fields which together represent all of the lines of a frame of the video content, albeit maybe not for each frame (i.e. time instance) of the content. For example a first field may represent the odd lines of a first frame, and then the next field in the video signal may represent the even lines of a frame which, depending on the type of content in the video signal, may be the same frame or a different frame to the first frame.

A de-interlacer is used to generate any missing lines of the video signal at each time instance to thereby recover full frames of the video signal. Compared to including full frames at each time instance in the video signal, interlacing allows fewer lines (and therefore less data) to be included in the video signal without a reduction in the frame rate of the video signal (although interlacing may introduce some extra complications and/or errors). Methods for implementing de-interlacing are known in the art (e.g. using interpolation), but in order for a de-interlacer to operate correctly, it needs to know the native temporal patterns of the video content in the video signal, i.e. the cadence of the video signal, as explained below. Therefore, a video processing unit may implement cadence detection in order to identify the cadence of a video signal. Having detected the cadence of the video signal the de-interlacer can correctly apply any necessary de-interlacing to the fields of the video signal.

Most video broadcast systems transmit video signals in an interlaced format, which includes a sequence of fields at a rate of, for example, 50 or 60 fields per second. As described above, the video signal may include video content of different types, e.g. interlaced or progressive. For example, films are usually shot at 24 or 25 frames per second, while video contents for TV may be shot at 50 or 60 frames per second. However, for each of these content types, the video signal is often broadcast in an interlaced format, such that a sequence of fields are included in the video signal at a field rate of e.g. 50 or 60 fields per second, with each field representing alternately the even and odd lines of the frames.

FIGS. 1a to 1d show how a sequence of frames (A, B, C, D, . . . ) is represented by the fields of the video signal in different examples which have different cadences. FIG. 1a shows a sequence of fields 102 which represent interlaced content for frames A to J. Each of the frames A to J represents a different time instance in the video content. The top line of fields in the sequence 102 represent the odd lines of the frames A, C, E, G and I, and the bottom line of fields in the sequence 102 represent the even lines of the frames B, D, F, H and J. The cadence of the sequence of fields 102 represents interlaced content (i.e. each field represents a different time instance). In order to determine the frames of the video content, a de-interlacer will generate the complementary fields at each time instance to thereby generate a sequence of frames 104. The de-interlacer generates the complementary fields A' to J' to represent the lines of the fields which are not included in the sequence 102, such that the resulting sequence of frames 104 includes all of the lines of the frames (both odd and even lines) for each of the frames A to J. It is noted that the complementary fields A' to J' include approximations of the original lines of the frames. The frames 104 can then be output (e.g. at 60 frames per second) to thereby output the frames A to J of the video signal. Methods for performing de-interlacing are known in the art.

FIG. 1b shows a sequence of fields 106 which represent progressive content for frames A to E, with a 2:2 cadence (which may simply be written as a 22 cadence). Progressive content often comprises images derived from film. For example, the video content may be a film at 25 frames per second and the video signal may have 50 fields per second such that each frame of the film can be represented over two fields of the interlaced video signal. Therefore, as shown in FIG. 1b, each frame is split into a top field (e.g. including odd lines) and a bottom field (e.g. including even lines). Therefore, the first two fields in the sequence 106 both relate to the same time instance, i.e. to frame A, then the next two fields both relate to the next time instance, i.e. to frame B, and so on. Fields may then be paired together accordingly to thereby generate a sequence of frames 108 which is to be output at 50 frames per second. As can be seen in FIG. 1b, each frame of the progressive video signal is repeated in the sequence of frames 108 such that the frames are output at the correct rate.

FIG. 1c shows another example in which a sequence of fields 110 represents progressive content for frames A to D, but this time with a 32 cadence. For example, the video content may be a film at 24 frames per second and the video signal may have 60 fields per second such that two frames of the film can be represented over five fields of the interlaced video signal. Therefore, as shown in FIG. 1c, a first frame (e.g. frame A) is split into a top field (e.g. including odd lines) and a bottom field (e.g. including even lines) whilst the next frame (e.g. frame B) has three fields relating to it: a top field then a bottom field and then a repeated top field. The sequence repeats as shown in FIG. 1c such that two fields relate to frame C and three fields relate to frame D. Fields may then be paired together accordingly to thereby generate a sequence of frames 112 which is to be output at 60 frames per second. As can be seen in FIG. 1c, frames A and C of the video signal are included twice in the sequence of frames 112 whilst frames B and D of the video signal are included three times in the sequence of frames 112, such that, on average, the frames are output at the correct rate. It is relatively straightforward, when the cadence of the video is known, to discard the repeated frames to recover the original (e.g. 24 frames per second) progressive video signal. In some systems the original progressive video signal may then undergo further processing such as interpolation, to increase the frame rate for display at, for example, 60 frames per second.

Similarly to FIG. 1c, FIG. 1d shows another example in which a sequence of fields 114 represents progressive content for frames A to D, but this time with a 2332 cadence. As with FIG. 1c, the video content may be a film at 24 frames per second and the video signal may have 60 fields per second such that two frames of the film can be represented over five fields of the interlaced video signal. Therefore, as shown in FIG. 1d, a first frame (e.g. frame A) is split into a top field (e.g. including odd lines) and a bottom field (e.g. including even lines) whilst the next frame (e.g. frame B) has three fields relating to it: a top field then a bottom field and then a repeated top field. In contrast to the example shown in FIG. 1c, three fields relate to frame C and two fields relate to frame D. Fields may then be paired together accordingly to thereby generate a sequence of frames 116 which is to be output at 60 frames per second. As can be seen in FIG. 1d, frames A and D of the video signal are included twice in the sequence of frames 112 whilst frames B and C of the video signal are included three times in the sequence of frames 112, such that, on average, the frames are output at the correct rate.

Many other cadences are possible in a video signal for use with different relationships between the temporal characteristics of the video content and the field rate of the video signal. For example, some other possible cadences with progressive video content are 2224, 32322, 55, 64 and 8787, and a person skilled in the art will appreciate that there are other possible cadences also.

It can be seen that characteristic temporal patterns arise when progressive video sequences are transmitted in an interlaced video format. Therefore, when a video signal is received, before de-interlacing is applied, cadence detection is applied in order to identify the type of content in the video signal (e.g. interlaced or progressive) and when progressive content is included to identify the cadence of the video signal. When progressive content is included in the video signal the identified cadence can be used to recover the original progressive frames by re-combining field pairs, and when interlaced content is included in the video signal, the de-interlacer can be used to interpolate the missing lines.

A typical approach to cadence detection is to detect high spatial frequency artefacts (known as "mouse teeth" artefacts) which are present when combining non-paired fields of a video signal that contains motion. For example, if the bottom field for frame A was combined with the top field for frame B then because the fields are from different frames (i.e. from different time instances) then some of the content will not align properly and there will be artefacts where the content does not align correctly. When there is motion in the content between the two frames making up the combined image, the artefacts may occur on every line of the combined image, such that the artefacts (which are the "mouse teeth" artefacts) have a characteristic spatial frequency corresponding to the number of lines in the image. The presence of artefacts with this characteristic spatial frequency can be detected. The presence of "mouse teeth" in a combined image indicates that the field pairing was incorrect and that a different field pairing should be selected. In this way the characteristic temporal patterns in the video signal can be identified. The temporal patterns in the video signal can then be used to identify the cadence of the video signal from a list of known possible cadences. However, this approach to cadence detection has the following limitations: (i) it has a lack of robustness to unknown cadences because it must have an awareness of possible cadences a priori; (ii) it is unlikely to be robust to bad-edits in the video content, where the cadence of the video signal is interrupted by editing of the video signal; and (iii) it is not robust to video content with multiple cadences, for example when a video text overlay (in an interlaced form) is added over the top of film (which has a progressive form).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

De-interlacers can be classified as either motion adaptive or motion compensated. If a de-interlacer is motion compensated then a motion estimator will be implemented for the purposes of de-interlacing. The inventor has realised that motion information (e.g. motion vectors) for blocks of fields of a video signal can be used for cadence analysis of the video signal. For example, it is particularly suitable to use the motion information for cadence analysis when the cadence analysis is performed on a video processing unit which already includes a motion estimation module configured to determine motion information for purposes other than cadence analysis. For example, if a motion compensated de-interlacer is implemented on a video processing unit which makes use of motion vectors then it can be particularly beneficial (e.g. incurring little extra cost) to use the motion vectors on the video processing unit for the further purpose of cadence analysis. Therefore, in these examples the motion vectors are not determined for the sole purpose of performing the cadence analysis.

There is provided a method of processing a video signal in a video processing unit, the video signal having an interlaced format and comprising a sequence of fields, the method comprising: obtaining motion indicators for blocks of the fields of the video signal; and using the obtained motion indicators to determine cadence signatures which are indicative of one or more cadences of the video signal, wherein the fields of the video signal are to be processed in accordance with the determined cadence signatures to thereby determine frames of the video signal.

For example, a method of processing a video signal in a video processing unit may be provided, wherein the video signal has an interlaced format and comprises a sequence of fields, and wherein the method comprises: obtaining motion indicators for blocks of the fields of the video signal; and using the obtained motion indicators to determine cadence signatures for blocks of a field, wherein the cadence signatures are indicative of one or more cadences of the video signal; creating a histogram of determined cadence signatures of blocks of the field; and determining the position of one or more peaks in the histogram to thereby determine one or more significant cadence signatures in the field; wherein the fields of the video signal are to be processed in accordance with the determined one or more significant cadence signatures to thereby determine frames of the video signal.

As another example, a method of processing a video signal in a video processing unit may be provided, wherein the video signal has an interlaced format and comprises a sequence of fields, and wherein the method comprises: obtaining motion indicators for blocks of the fields of the video signal; using the obtained motion indicators to determine cadence signatures which are indicative of one or more cadences of the video signal; and using the determined cadence signatures to identify one or more cadences of the video signal by: (i) identifying one or more prevalent cadence signatures from the determined cadence signatures, and (ii) mapping each of the one or more prevalent cadence signatures to a known cadence from a set of known cadences which have known cadence signatures by determining which of the known cadence signatures of the known cadences has a smallest distance to the prevalent cadence signature; wherein the fields of the video signal are to be processed in accordance with the identified one or more cadences to thereby determine frames of the video signal.

This is also provided a video processing unit configured to process a video signal, the video signal having an interlaced format and comprising a sequence of fields, the video processing unit being configured to obtain motion indicators for blocks of the fields of the video signal, wherein the video processing unit comprises: a cadence analysis module configured to use the obtained motion indicators to determine cadence signatures which are indicative of one or more cadences of the video signal, wherein the video processing unit is configured to process the fields of the video signal in accordance with the determined cadence signatures to thereby determine frames of the video signal.

For example, a video processing unit configured to process a video signal may be provided, wherein the video signal has an interlaced format and comprises a sequence of fields, the video processing unit being configured to obtain motion indicators for blocks of the fields of the video signal, wherein the video processing unit comprises: a cadence analysis module configured to: use the obtained motion indicators to determine cadence signatures for blocks of a field, wherein the cadence signatures are indicative of one or more cadences of the video signal; create a histogram of determined cadence signatures of blocks of the field; and determine the position of one or more peaks in the histogram to thereby determine one or more significant cadence signatures in the field; wherein the video processing unit is configured to process the fields of the video signal in accordance with the determined one or more significant cadence signatures to thereby determine frames of the video signal.

As another example, a video processing unit configured to process a video signal may be provided, wherein the video signal has an interlaced format and comprises a sequence of fields, the video processing unit being configured to obtain motion indicators for blocks of the fields of the video signal, wherein the video processing unit comprises: a cadence analysis module configured to use the obtained motion indicators to determine cadence signatures which are indicative of one or more cadences of the video signal, and to use the determined cadence signatures to identify one or more cadences of the video signal by: (i) identifying one or more prevalent cadence signatures from the determined cadence signatures, and (ii) mapping each of the one or more prevalent cadence signatures to a known cadence from a set of known cadences which have known cadence signatures by determining which of the known cadence signatures of the known cadences has a smallest distance to the prevalent cadence signature, wherein the video processing unit is configured to process the fields of the video signal in accordance with the identified one or more cadences to thereby determine frames of the video signal.

There may be provided computer readable code adapted to perform the steps of any of the methods described herein when the code is run on a computer. Furthermore, there may be provided computer readable code for generating a video processing unit according to any of examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 4a shows a representation of the motion of the blocks of fields of a video signal over a sequence of nine fields in a first example;

FIG. 4b shows the cadence signatures for blocks of a field determined from the motion analysis shown in FIG. 4a;

FIG. 5a shows a representation of the motion of the blocks of fields of a video signal over a sequence of nine fields in a second example;

FIG. 5b shows the cadence signatures for blocks of a field determined from the motion analysis shown in FIG. 5a;

Figure 1B:
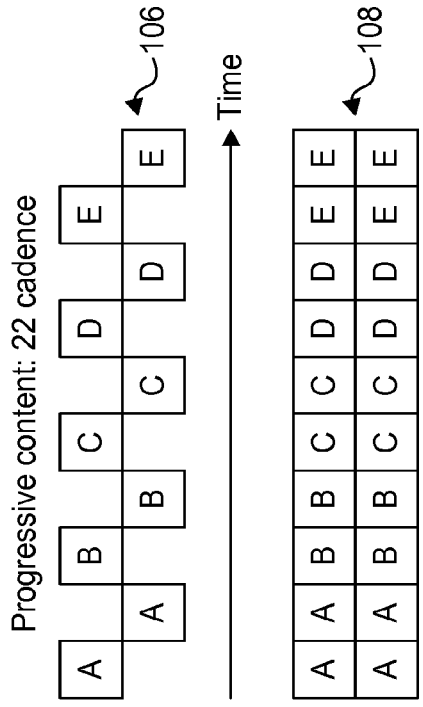
FIGS. 1a to 1d show how a sequence of frames is represented by the fields of a video signal in different examples which have different cadences.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

As described above, a video signal having an interlaced format comprises a sequence of fields, but the video content represented by the fields of the video signal may be of different content types and/or different cadences. When interlaced content is included in the video signal then each field corresponds to a different time instance (i.e. a different frame), and a de-interlacer is used to reconstruct full frames at each time instance from the sequence of fields. However, when progressive video content is represented in an interlaced format, the progressive frames need to be stored in interlaced fields, and the relationship between the frame rate of the video content and the field rate of the video signal determines the cadence of the video signal.

In examples described herein, motion vector information for blocks of the fields of the video signal is used to derive a cadence signature which is indicative of one or more cadences of the video signal. In some examples, the cadence signatures are used to identify the cadence of the video signal from a set of known cadences. In other examples, the cadence signatures may be used to derive field pairings without necessarily explicitly detecting the cadence of the video signal. By detecting the cadence of the video signal, the content type of the content in the video signal will be detected (e.g. as interlaced content or progressive content) because interlaced content has a different cadence to progressive content.

Motion estimation is a known process which can be used to determine a motion vector for each block of a field which describes the motion of that block relative to the content of another field from the video signal. For example, where motion vectors are to be determined for blocks of a current field, a backward motion estimator may compare blocks of the current field with content from a previous (e.g. the immediately preceding) field from the video signal in order to determine a motion vector (referred to as a backward motion vector) describing the motion of the content between the previous field and the current field. As another example, a forward motion estimator may compare blocks of the current field with content from a subsequent (e.g. the immediately following) field from the video signal in order to determine a motion vector (referred to as a forward motion vector) describing the motion of the content between the current field and the subsequent field. As another example, a bidirectional motion estimator may compare content of the previous field with content from the subsequent field from the video signal in order to determine a motion vector for the block of the current field (referred to as a bidirectional motion vector) describing the motion of the content between the previous field and the subsequent field. Further details of motion estimation are known to those skilled in the art and for conciseness are not included in this description.

Motion estimation is used for some processing steps which may be performed on a video signal, e.g. for de-interlacing, frame rate conversion or scaling, etc. However, typically in the prior art, the cadence of the video signal would be detected before any motion estimation is performed because until cadence detection has been performed, a video processing unit does not know how to interpret a video signal. For example, motion estimation should not attempt to estimate motion between repeated frames of progressive content, e.g. for frame rate conversion, because the zero motion between repeated instances of the same frame does not represent the true motion of objects in the scene. However, in examples described herein, motion estimation is performed and used to derive a cadence signature, which can then be used to detect the cadence of the video signal and/or to appropriately match progressive field pairs.

Figure 2:
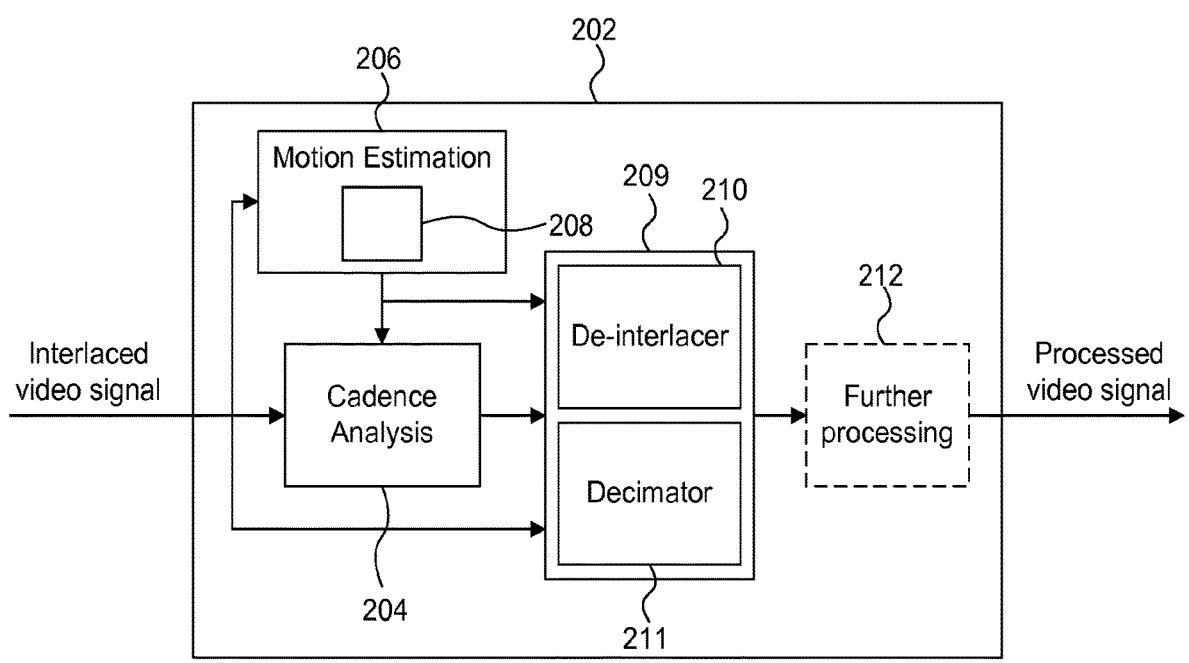
FIG. 2 shows a functional block diagram of a video processing unit.

FIG. 2 shows a video processing unit 202 which is configured to process a video signal. The video signal is received at the video processing unit 202 having an interlaced format and comprising a sequence of fields, and the video processing unit 202 performs video processing operations on the video signal to thereby determine and output a processed video signal. The video processing unit 202 comprises a cadence analysis module 204, a motion estimation module 206 and a frame processing module 209. The video processing unit 202 may also optionally comprise one or more further processing modules 212. The motion estimation module 206 comprises one or more motion estimators 208. The motion estimation module 206 is an example of a motion analysis module which could be used. As described below, in other more general examples, a motion analysis module may analyse motion in the video signal without actually estimating the motion (e.g. without actually determining motion vectors), and the results of such motion analysis could be used for cadence analysis in a similar manner to that in which the results of the motion estimation are used in the examples described in detail herein. The frame processing module 209 may include one or both of a de-interlacer and a decimator. In the example shown in FIG. 2 the frame processing module 209 includes both the de-interlacer 210 and the decimator 211. The de-interlacer 210 is configured to implement interpolation to approximate missing lines of an interlaced video signal. The decimator 211 is configured to remove repeated frames from a video signal which includes progressive content. Therefore the frame processing module 209 may be capable of performing one or both of the de-interlacing and decimating functions.

The modules of the video processing unit 202 shown in FIG. 2 may be implemented in hardware, software or a combination thereof. The cadence analysis module 204, the motion estimation module 206 and the frame processing module 209 are arranged to receive the interlaced video signal. An output of the cadence analysis module 204 is coupled to an input of the frame processing module 209. An output of the motion estimation module 206 is coupled to an input of the cadence analysis module 204 and to an input of the frame processing module 209. An output of the frame processing module 209 is arranged to provide a processed video signal to which further processing may be applied by the further processing module(s) 212 before the video signal is output from the video processing unit 202. The processed video signal output from the video processing unit 202 may be used in any suitable manner, e.g. it may be displayed on a display or stored in a memory.

The operation of the video processing unit 202 is described with reference to the flow chart shown in FIG. 3.

An interlaced video signal is received at the video processing unit 202. For example, the video signal may be a broadcast video signal (e.g. a television signal) having an interlaced format wherein the video processing unit 202 may for example be implemented in a set top box which receives the video signal and passes the video signal to the video processing unit 202 for processing. The interlaced video signal is passed to the cadence analysis module 204 and to the motion estimation module 206.

In step S302 the motion estimation module 206 determines motion vectors for blocks of the fields of the video signal. A block for which a motion vector is determined is a group of pixels of a field, which in general may have any suitable size and shape, such as a 4×4, 8×8, 16×8, or 16×16 block of pixels. Methods of determining motion vectors for blocks of fields of the video signal are known in the art, and therefore those skilled in the art will readily understand how to implement motion detection without further explanation. For example, the motion estimator 208 may be a backwards motion estimator, which as described above, determines motion vectors for blocks of a current field by comparing the contents of the blocks with the contents of a previous field of the video signal. Additionally or alternatively, other types of motion estimator may be used such as a forwards motion estimator and/or a bidirectional motion estimator as described in more detail below with reference to FIG. 8. The motion vectors are output from the motion estimation module 206 and received by the cadence analysis module 204.

In step S304 the cadence analysis module 204 assigns a binary motion flag to each block of the fields of the video signal based on the motion vectors received from the motion estimation module 206. For example, the magnitude of the motion vector for a block may be used to determine the binary flag to be assigned to that block, such that if the motion vector for the block in a particular field is indicative of there being no motion then the binary flag assigned to the block in the particular field is a first binary value (in the examples described herein the first binary value is zero, but in other examples the first binary value could be one), and if the motion vector for the block in the particular field is indicative of there being some motion then the binary flag assigned to the block in the particular field is a second binary value (in the examples described herein the second binary value is one, but in other examples the second binary value could be zero). A motion vector may be considered to be indicative of there being no motion if its magnitude is not greater than a threshold, which may be close to, or equal to, zero; whilst a motion vector may be considered to be indicative of there being some motion if its magnitude is greater than the threshold.

Figures 4A, 4B:
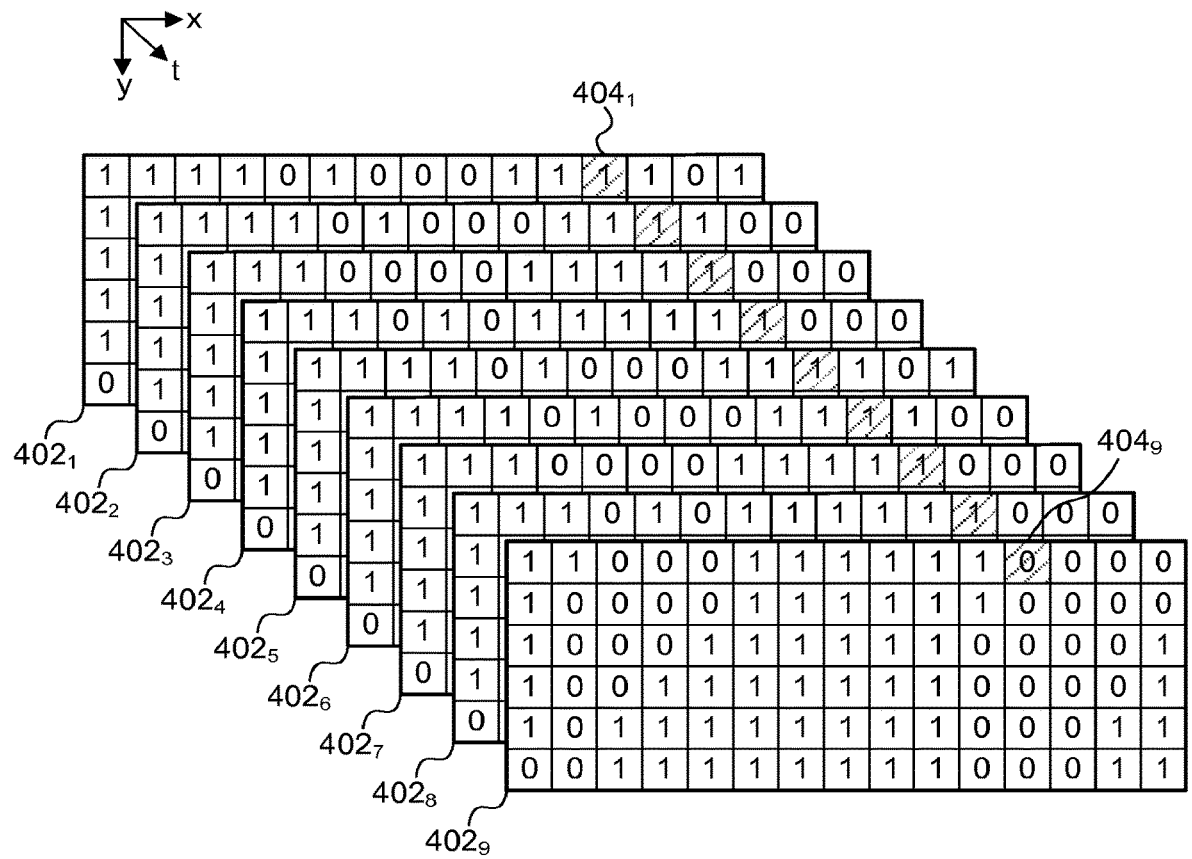

FIG. 4a shows an example of the binary flags which are assigned to the blocks in a sequence of nine consecutive fields ($402_1$ to $402_9$) of a video signal which comprises interlaced video content. In this example, the field $402_9$ is a current field and the fields $402_1$ to $402_8$ are the eight fields immediately preceding the current field $402_9$ in the video signal. In the example shown in FIG. 4a each field includes a 6×15 array of blocks for which a binary flag (either a one to indicate some motion or a zero to indicate no motion) has been assigned based on the motion vectors for the blocks. For the purposes of explanation, a particular block 404 in the sequence of fields $402_1$ to $402_9$ is highlighted by hatching.

In step S306, for each block, the binary flags over the sequence of consecutive fields (e.g. over nine consecutive fields) are concatenated to thereby determine a cadence signature for the block in the current field $402_9$. In other examples, a different number of fields (e.g. other than nine) may be included in the sequence of fields from which the binary flags are concatenated to determine the cadence signatures. The greater the number of fields included in the sequence, the more data is needed to be stored in order to generate the cadence signatures, but the greater the likelihood that the cadence signatures can be used to correctly identify the cadence of the video signal, as described in more detail below.

FIG. 4b shows the results (represented in decimal form) of the concatenations of the binary flags in step S306 for the current field $402_9$ as an array of cadence signatures 406. That is, the numbers shown in the array 406 are the cadence signatures for the respective blocks of the current field $402_9$. As an example, the concatenation of the binary flags for block 404 over the nine fields yields a cadence signature of 111111110 as a binary string which is 510 in decimal notation. The same concatenation is performed for each of the blocks in the current field $402_9$ to give the cadence signatures shown in FIG. 4b for the respective blocks.

Figures 5A, 5B:
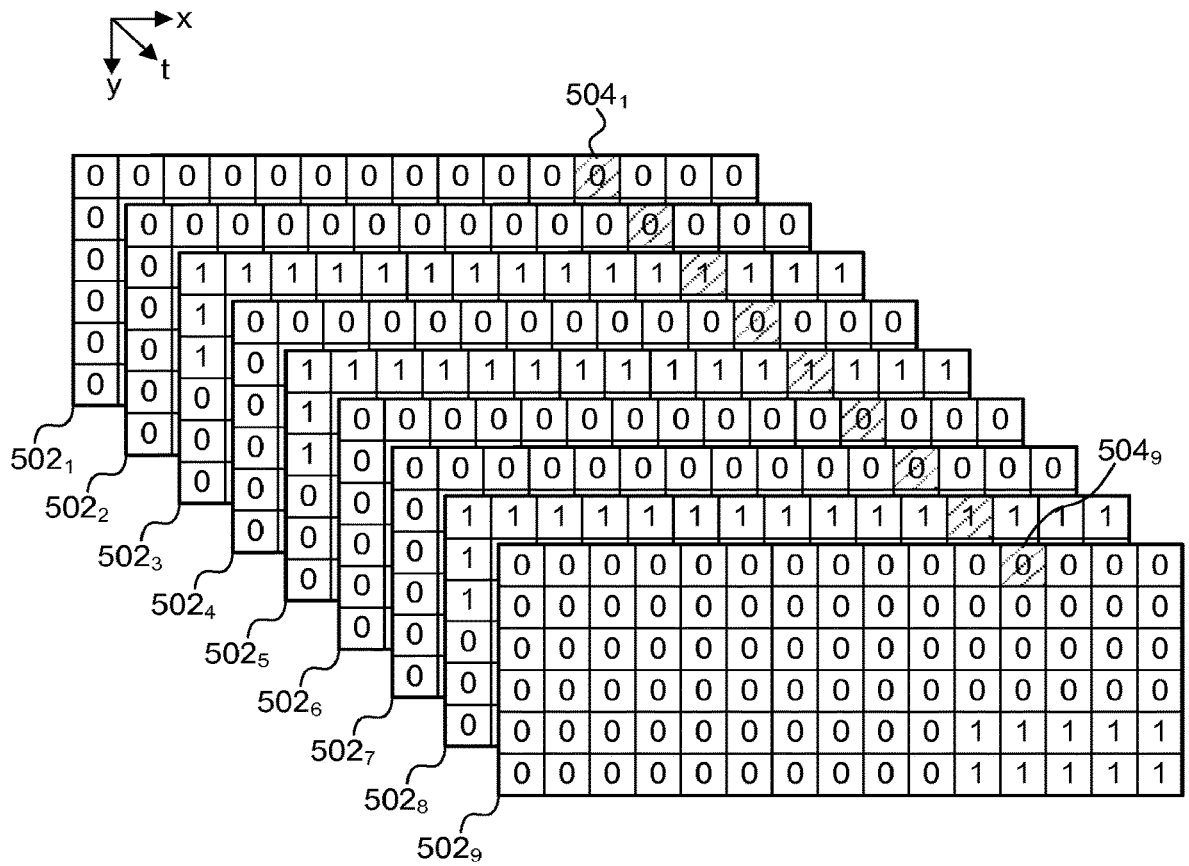

FIGS. 5a and 5b show an example of the binary flags which are assigned to the blocks in a sequence of nine consecutive fields ($502_1$ to $502_9$) of a video signal which comprises progressive video content having a 32 cadence. In this example, the field $502_9$ is a current field and the fields $502_1$ to $502_8$ are the eight fields immediately preceding the current field $502_9$ in the video signal. As with FIG. 4a, in the example shown in FIG. 5a, each field includes a 6×15 array of blocks for which a binary flag has been assigned based on the motion vectors for the blocks. For the purposes of explanation, a particular block 504 in the sequence of fields $502_1$ to $502_9$ is highlighted by hatching.

FIG. 5b shows the results (represented in decimal form) of the concatenations of the binary flags in step S306 for the current field $502_9$ as an array of cadence signatures 506. That is, the numbers shown in the array 506 are the cadence signatures for the respective blocks of the current field $502_9$. As an example, the concatenation of the binary flags for block 504 over the nine fields yields a cadence signature of 001010010 as a binary string which is 82 in decimal notation. The same concatenation is performed for each of the blocks in the current field $502_9$ to give the cadence signatures shown in FIG. 5b for the respective blocks.

Since in the examples shown in FIGS. 4a, 4b, 5a and 5b nine flags are concatenated to form the cadence signatures, the cadence signatures are in the range from 0 to 511. In general, if N binary flags are concatenated to form the cadence signatures, the cadence signatures are in the range from 0 to $2^N-1$. The cadence signatures shown in FIGS. 4b and 5b are indicative of the cadence of the respective video signals.

The video signal includes video content of one or more types from a set of available video content types which have different cadences. For example, the set of available video content types includes an interlaced content type and a progressive content type. The determined cadence signatures are used to determine the one or more types of the video content in the video signal. In particular, as an example, an analysis of the cadence signatures may be performed in order to assign each of the blocks in the current field (e.g. field $502_9$) to one of four types: (i) static content type; (ii) interlaced content type; (iii) progressive content type; or (iv) low confidence. In step S308 a global analysis of the blocks in the current field is performed to analyse the cadence signatures to thereby determine which type(s) of content are present in the current field (e.g. field $502_9$).

That is, each of the blocks in the current field is assigned to one of the types based on the determined cadence signature for that block. It is noted that if the content in a block of the video signal is not changing over a number of frames then the motion vectors for that block will be zero regardless of the video content type and the method described herein does not determine whether the content of that block is interlaced or progressive and as such the block is assigned the static content type. If the content in a block is truly static then, for the purposes of this description, it does not matter whether the block is interpreted as interlaced content or progressive content since in both cases the content of the block can be reconstructed correctly for inclusion in the final processed video signal. Furthermore, in some situations the cadence signature for a block might not provide a good indication of a particular content type, in which case the block can be assigned to a low confidence type to indicate that the content type of the block has not been determined with confidence. The use of the low confidence type reduces the likelihood of processing a block in accordance with the wrong content type.

When the motion estimator 208 determines the motion vectors for the blocks of the fields of the video signal according to known motion estimation techniques, it may determine a confidence indication indicating a level of confidence that the motion vector is correct. For example, the motion estimator 208 may set a low confidence indication depending on content characteristics and disparity with neighbouring motion vectors. The confidence indications may be passed from the motion estimation module 206 to the cadence analysis module 204. The cadence analysis module 204 may assign a block to the low confidence type based on the confidence indications received from the motion estimation module 206. For example, the cadence analysis module 204 may assign a block to the low confidence type based on the current motion estimation confidence for the block. In some examples (described in more detail below with reference to FIG. 8) the motion estimation module 206 comprises: (i) a backward motion estimator configured to generate backward motion vectors ("bwd") for blocks of a current field; (ii) a bidirectional motion estimator configured to generate bidirectional motion vectors ("bidir") for blocks of the current field; and (iii) a forward motion estimator configured to generate forward motion vectors ("fwd") for blocks of the current field; and in these examples the cadence analysis module 204 may assign a block to the low confidence type if $|(fwd|bwd)|>|bidir|$.

If a block is not assigned to the low confidence type then the block may be assigned to a content type based on the number of bits ($N_{motion}$) of the cadence signature which are a 1 (i.e. indicating that motion is present). It should be apparent that in some other examples the number of zeroes could instead be used. However, in the examples described herein, if the number of ones in the cadence signature ($N_{motion}$) for a block is below a lower threshold then the block is assigned to the static content type and if $N_{motion}$ for a block is above an upper threshold then the block is assigned to the interlaced content type. For example, where N=9, the lower threshold may be 1 and the upper threshold may be 5. In a more general example, the lower threshold may be given by $$\left\lfloor \frac{N}{8} \right\rfloor$$

and the upper threshold may be given by $$\left\lceil \frac{N}{2} \right\rceil.$$

In this way, if more than $$\left\lceil \frac{N}{2} \right\rceil$$

of the N bits of the cadence signature for a block are a 1 then the block is classified as an interlaced block. This makes sense because each frame of progressive content will relate to at least two consecutive fields of the interlaced video signal, such that the greatest number of ones in a cadence signature of length N, for progressive content, is $$\left\lceil \frac{N}{2} \right\rceil.$$

Furthermore, since each field of an interlaced sequence is from a different time instance, if motion is present in the scene it will be detected between each pair of consecutive fields. Therefore, the number of ones in a cadence signature of length N, for interlaced content, may approach N. So if the number of ones in a cadence signature exceeds the upper threshold then it is determined that the block does not relate to progressive content, and so is assigned the interlaced content type. If the number of ones in the cadence signature ($N_{motion}$) is less than the lower threshold this indicates that there is no motion (or very little motion) in the content of the block over the previous N fields and as such the block is assigned the static content type.

The remaining blocks, i.e. the blocks for which the low confidence type has not been assigned and for which $N_{motion}$ is not less than the lower threshold nor greater than the upper threshold, are likely to be blocks of progressive content. However, a further check may be performed which includes determining the number of times that consecutive ones are found in the cadence signature ($N_{consecutive}$) and to check that this is below a further threshold ($Th_{consecutive}$). It can be appreciated that, if no errors are present, progressive content should not include any consecutive ones in the cadence signature because the content should not change twice in two consecutive fields. However, in some cases (e.g. if errors are present or if a bad edit such as a scene cut in the video content results in progressive content which does change twice in two consecutive fields of the video signal) progressive content may occasionally result in content which changes twice in two consecutive fields. Therefore, in the example in which N=9, the threshold, $Th_{consecutive}$, is set to be 2. As a general example, $Th_{consecutive}$ may be given by $$\left\lceil \frac{N}{8} \right\rceil.$$

If $N_{consecutive} < Th_{consecutive}$ then the block is assigned to the progressive content type. However, if $N_{consecutive} \leq Th_{consecutive}$ then this is indicative of there being lots of errors present and as such the block is assigned to the low confidence type, rather than risking assigning the block to the progressive type incorrectly. The values of the thresholds described herein are implementation dependent and may be configurable.

As an example, in relation to FIGS. 4a and 4b the block $404_9$ which has a cadence signature of 510 will be assigned to the interlaced content type (assuming that the motion estimation module 206 did not indicate that the motion vectors for more than 2 of the blocks $404_1$ to $404_9$ had a low confidence). This is because the number of ones in the cadence signature for block 404 over the nine fields (which has a decimal value of 510 and a binary value of 111111110) is eight, i.e. it is greater than five.

As another example, in relation to FIGS. 5a and 5b the block $504_9$ which has a cadence signature of 82 will be assigned to the progressive content type (assuming that the motion estimation module 206 did not indicate that the motion vectors for more than 2 of the blocks $504_1$ to $504_9$ had a low confidence). This is because the number of ones in the cadence signature for block 504 over the nine fields (which has a decimal value of 82 and a binary value of 001010010) is three, i.e. it is not less than two nor greater than five, and the number of consecutive ones in the cadence signature is zero, i.e. it is less than 2. Furthermore, all of the blocks with cadence signatures of 82 will be assigned to the progressive content type. It can be appreciated that by applying the rules described above, the blocks shown in FIG. 5b with cadence signatures of 0 will be assigned to the static content type; whilst the blocks shown in FIG. 5b with cadence signatures of 511 will be assigned to the interlaced content type.

Once each of the blocks of the current field have been assigned to one of the four types, then in step S310 it is determined whether the number of progressive blocks in the current field (e.g. field $502_9$) exceeds a threshold. That is, the number of blocks in the field which are assigned to the progressive content type is determined and compared to a threshold. The threshold may, for example, be 5 in the case of the examples shown in FIGS. 4a to 5b in which there are 90 blocks in a field. In a general example, the threshold may be approximately a twentieth of the number of blocks in each field. Another test may be performed to determine whether the result of $$\frac{|P|}{|I| + |P|}$$

is greater than a second threshold (e.g. where the second threshold may be 0.1, as an example), where |P| is the number of progressive blocks in the current field and |I| is the number of interlaced blocks in the current field. If the number of progressive blocks in the current field exceeds the threshold(s) then there is sufficient progressive content in the current field for it to be useful to determine the cadence and/or field pairings of the progressive blocks of the current field. Therefore, in this example the method passes to step S312 and to step S314 when the test(s) of step S310 is(are)

passed. As examples, the fields shown in FIGS. 5a and 5b will include more than five progressive blocks whereas the fields shown in FIGS. 4a and 4b will not include more than 5 progressive blocks. It is noted that there is a bias towards caution when detecting progressive content because it is less visually objectionable to treat progressive content as interlaced than vice-versa.

In step S312 the determined cadence signatures are used to derive field pairings of consecutive fields which relate to the same time instance (i.e. the same frame) of the video content. That is, for blocks which are determined to include progressive content, the field pairings are determined based on the cadence signatures for the blocks. For example, this can be done by considering the position of zeroes in the cadence signatures for blocks assigned to the progressive content type because a zero in the cadence signature indicates that there has been no motion between two consecutive fields, which may therefore be an indication that the fields relate to the same frame of the progressive content. Therefore, the field pairings can be derived by finding the zeroes (or in alternative examples the ones, where ones are used to indicate that no motion has occurred) in the most recent elements of the cadence signatures for the blocks of a field.

For example, if the motion vectors are backwards motion vectors which compare motion between the current field (e.g. field $502_9$) and the previous field (e.g. field $502_8$) then a zero in the binary motion flag of the current field (e.g. a zero for flag $504_9$) indicates that there has been no motion in the block 504 between fields $502_8$ and $502_9$. Therefore, in this case, if all of the blocks in the field $502_9$ have a binary flag of zero then the fields $502_8$ and $502_9$ are deemed to be matching fields (i.e. relate to the same frame of the progressive content). Therefore, in this case fields $502_8$ and $502_9$ are paired together in step S312. As another example, which is different to the example shown in FIG. 5a, if the motion vectors are forwards motion vectors which compare motion between a current field and the next field then a zero in the binary motion flag for a block of the current field indicates that there is no motion in the block between current field and the next field. Therefore, in this case the current and next fields are deemed to be matching fields (i.e. relate to the same frame of the progressive content). Therefore, in this case, if all of the blocks in the current field have a binary flag of zero then the current and next fields are paired together in step S312. It is noted that the term "field pairing" is used to indicate that two or more (not necessarily just two) fields of the video signal relate to the same frame of the progressive content. For example, three of the fields in the video signal 110 shown in FIG. 1c relate to frame B and all three of these fields will be deemed to be matching and this will be indicated in the field pairings derived in step S312.

It can be appreciated that the field pairings are derived for the progressive content of the video signal in step S312 without necessarily determining the cadence of the progressive content. In some examples this could be the end of the analysis performed by the cadence analysis module 204, if the field pairings are all that are needed to be determined by the cadence analysis. In these examples, the field pairings are derived based on the motion vectors for the blocks of the fields of the video signal. It is noted that the field pairing technique, which is based on the motion vectors that were determined for the blocks, is robust to bad edits of video content, e.g. where a scene is cut thereby separating a matching pair of fields, because the field pairing may be determined for each field based on the binary flags of the blocks representing the most recent motion vectors. This is in contrast to a method which may determine a field pairing pattern and then assume that this pattern will continue which could encounter problems at scene cuts which separate a matching pair of fields.

In other examples, in addition to or as an alternative to step S312, steps S314 to S320 described below are implemented to identify the cadence of the blocks of the current field based on the cadence signatures.

Figure 6:
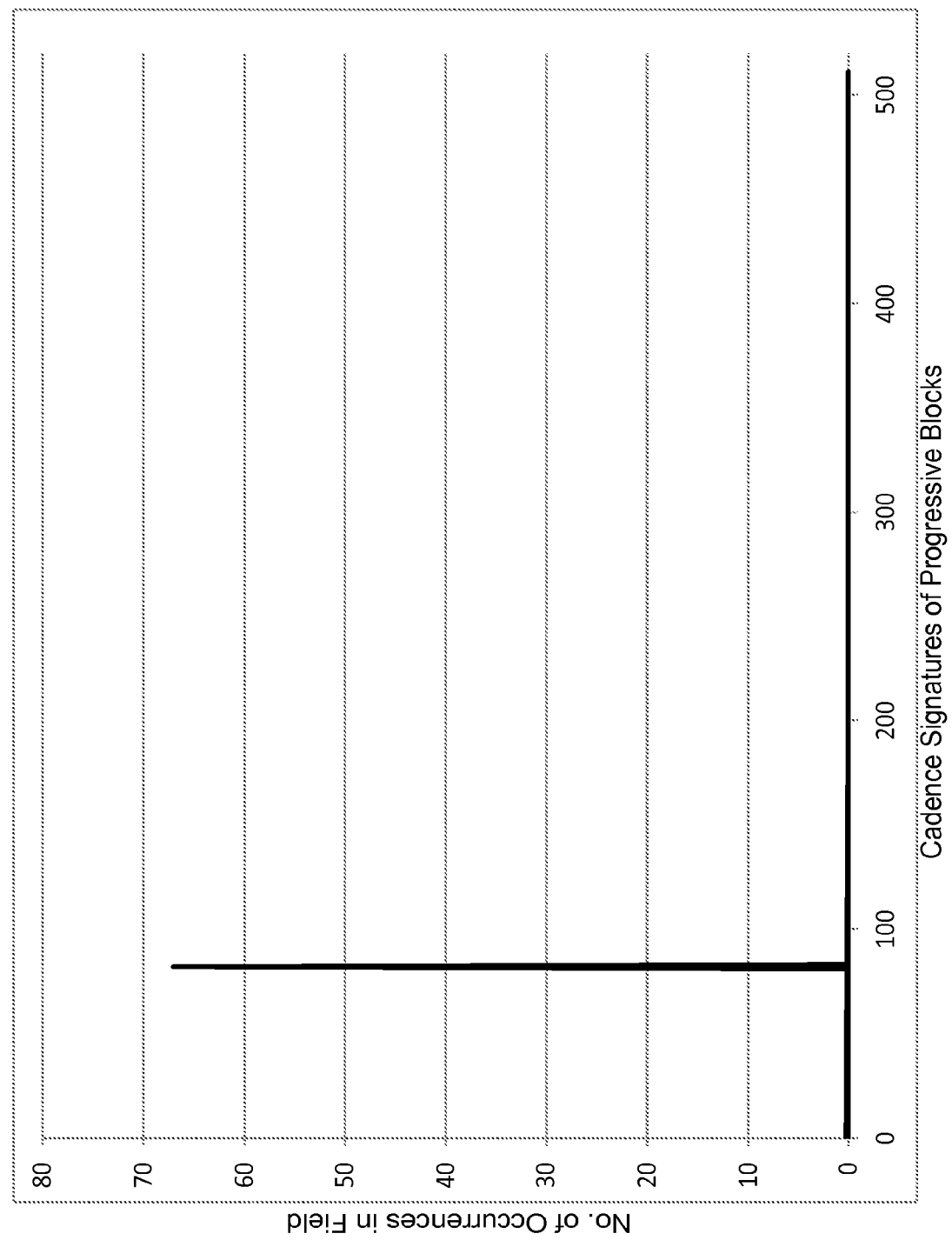
FIG. 6 shows a histogram of the cadence signatures of the progressive blocks shown in FIG. 5b.

In step S314 a histogram is created of the cadence signatures of the blocks of the current field which are assigned to the progressive content type. The histogram is referred to as a progressive cadence signature histogram. FIG. 6 shows an example of the progressive cadence signature histogram that is determined using the cadence signatures of the progressive blocks shown in the example shown in FIGS. 5a and 5b. As described above, in the example shown in FIG. 5b, in the current field $502_9$ it is only the blocks with cadence signatures of 82 that will have been assigned to the progressive content type and therefore all of the blocks assigned to the progressive content type in the current field have a cadence signature of 82 in this example. As such, the histogram shown in FIG. 6 shows a single peak at a cadence signature of 82 and is zero at every other position. This is a simplified example for the purposes of illustration, and in other examples it is likely that some other cadence signatures will be included such that there may be other smaller peaks in the histogram and/or some noise in the histogram. For example, if there happens to be no motion in a particular block between a pair of frames of the video content then the cadence signature for the particular block would not match the cadence of the progressive content so may show up as a peak at a different position in the progressive cadence signature histogram.

However, there is likely to be a significant peak in the progressive cadence signature histogram at a position which does match the cadence of the progressive content, and the other peaks are likely to be smaller than the significant peak. Furthermore, if different regions of the frames of the video content have different cadences (e.g. when there is a mix of different video content being displayed, for example if some text is overlaid on top of a film) then there may be a significant peak (i.e. a large peak) in the progressive cadence signature histogram at each position which matches one of the different cadences which are present in the video content. A peak is determined to be significant and therefore indicative of a cadence in the video signal if the peak is higher than a threshold in the progressive cadence signature histogram. This threshold is set to avoid identifying erroneous small peaks in the histogram as being indicative of a cadence, and for example may be set at 5% of the number of blocks which are determined to have the progressive content type. In more complex examples, the threshold may be set based on a number of factors, including one or more of: (i) the proportion of blocks which are progressive, ii) the proportion of blocks of the dominant cadences, and iii) some hysteresis so that the method takes a number of frames to start detecting a cadence being present, at which point the required thresholds to continue detecting the cadence are lowered.

In step S316 the position of one or more peaks in the progressive cadence signature histogram is determined to thereby determine one or more significant (or "prevalent") cadence signatures in the field.

In step S318, the cadence signatures identified in step S316 are mapped to known cadences, such that one or more cadences of the video signal are identified. That is, the significant peaks in the progressive cadence signature histogram correspond to cadences which are present in the video signal. In order to implement step S318 the cadence analysis module 204 may use a set of known cadences which have known cadence signatures. In this case, the cadence analysis module 204 determines which of the known cadence signatures of the known cadences has the greatest similarity with a significant cadence signature from the histogram to thereby map the significant cadence signature to a known cadence. This is done for each of the cadence signatures that were identified from the histogram in step S316.

For example, the table below shows the known nine-bit cadence signatures for known cadences of 22, 2224, 32 and 2332:

| Cadence | Binary Cadence Signature | Decimal Cadence Signature |
|---|---|---|
| 22 | 010101010 | 170 |
| 22 | 101010101 | 341 |
| 2224 | 010101000 | 168 |
| 2224 | 101010001 | 337 |
| 2224 | 010100010 | 162 |
| 2224 | 101000101 | 325 |
| 2224 | 0110001010 | 138 |
| 2224 | 100010101 | 277 |
| 2224 | 000101010 | 42 |
| 2224 | 001010101 | 85 |
| 2224 | 010101010 | 170 |
| 2224 | 101010100 | 340 |
| 32 | 010010100 | 148 |
| 32 | 100101001 | 297 |
| 32 | 001010010 | 82 |
| 32 | 010100101 | 165 |
| 32 | 101001010 | 330 |
| 2332 | 010010010 | 146 |
| 2332 | 100100101 | 293 |
| 2332 | 001001010 | 74 |
| 2332 | 010010101 | 149 |
| 2332 | 100101010 | 298 |
| 2332 | 001010100 | 84 |
| 2332 | 010101001 | 169 |
| 2332 | 101010010 | 338 |
| 2332 | 010100100 | 164 |
| 2332 | 101001001 | 329 |

So if the cadence analysis module 204 is limited to identifying the 22, 2224, 32 and 2332 cadences then the cadence analysis module 204 may store a look-up table for the values in the table shown above which can be used to link cadence signatures to specific cadences. For example, the current field $502_9$ in the example shown in FIG. 5a has a significant cadence signature of 82 and so the cadence analysis module 204 can use the table shown above to map this cadence signature to a 32 cadence. It is noted that in the table shown above, both the 22 and the 2224 cadences may result in a nine-bit cadence signature of 170. One way to differentiate between the two cadences would be to increase the number of bits used in the cadence signatures. For example, if ten bits were used for the cadence signatures then the cadences 22 and 2224 would not result in the same cadence signatures. Another way to address this problem without increasing the number of bits used for the cadence signatures is to store a history of the significant cadence signatures over a sequence of fields. For example, if the significant cadence signatures in a sequence of fields are 170 then 341, it is likely that the cadence of the video signal is 22, whereas if the significant cadence signatures in a sequence of fields are 170 then 340, it is likely that the cadence of the video signal is 2224. Therefore, a history of significant cadence signatures over a sequence of fields can be used to distinguish between cadences which happen to result in the same cadence signatures for one particular field. This means that in these examples, at least some of the significant cadence signatures are stored from a previous field for use with a current field in order to correctly identify the cadences which are present in the current field.

Other cadences, such as 32322, 55, 64 and 8787 may be included in the table of known cadences and their cadence signatures. This allows the cadence analysis module 204 to identify the other cadences in the video signal also. However, the inclusion of more cadences in the table will increase the number of cadence signatures which are not unique to a cadence, and will therefore increase the need to distinguish between cadences having the same cadence signature, e.g. as described above by storing a history of the significant cadence signatures for a sequence of fields or by increasing the number of bits in the cadence signatures. Therefore, the table of known cadences might be configured to store the known cadence signatures only for cadences which are likely to occur in the video signal. The table of known cadences used by the cadence analysis module 204 may be configurable.

The likelihood of different cadences occurring may vary depending upon the system in which the video processing unit 202 is implemented. For example, if the video processing unit 202 is implemented in a set top box which is arranged to receive broadcast video signals which are to be output at 60 Hz then likely cadences for progressive content included in the video signal are 32 and 2332 for films having a frame rate of 24 frames per second and 32322 for films having a frame rate of 25 frames per second. So, in these examples, the cadence analysis module 204 may be configured to have a table which includes the cadence signatures for the 32, 2332 and 32322 cadences but might not include cadences signatures for other, less likely cadences. In another example, if the video processing unit 202 is implemented in a set top box which is arranged to receive broadcast video signals which are to be output at 50 Hz then a likely cadence for progressive content included in the video signal is 22 for films having a frame rate of 25 frames per second. So, in these examples, the cadence analysis module 204 may be configured to have a table which includes the cadence signatures for the 22 cadence but might not include cadences signatures for other, less likely cadences. Some devices may be configured to receive all content types, but if a device is dealing with 50 Hz then it may use one table which includes the cadence signatures for the cadences that are relevant to outputting at 50 Hz (e.g. the 32, 2332 and 32322 cadences); and if the device is dealing with 60 Hz then it may use another table which includes the cadence signature(s) for the cadence(s) that is(are) relevant to outputting at 60 Hz (e.g. the 22 cadence).

It is possible that a significant cadence signature determined from the progressive cadence signature histogram does not exactly match one of the known cadences from the table. In which case the cadence analysis module 204 will map the significant cadence signature to a known cadence from the table by determining which of the known cadence signatures from the table has the greatest similarity with the significant cadence signature. This may comprise determining which of the known cadence signatures of the known cadences has a smallest distance to the significant cadence signature. The smallest distance may for example be a smallest Hamming distance, but it is noted that in other examples, a different type of distance, other than a Hamming distance, may be used to indicate measures of similarity between a significant cadence signature in the field and the known cadence signatures.

A person skilled in the art would know how to determine a Hamming distance. A Hamming distance between a significant cadence signature and a known cadence signature indicates how many bits are different between the two cadence signatures. Therefore, the smallest Hamming distance will correspond to the minimum number of bits that need to be changed to map the significant cadence signature to a known cadence signature. If more than one of the known cadence signatures have the smallest Hamming distance to a significant cadence signature then a history of a sequence of fields may be considered in order to resolve the ambiguity as described above. In other examples, an asymmetric weighting could be used to determine a distance measure whereby a particular bit in a cadence signature which is different to the corresponding bit in a known cadence signature is assigned a different weighting if the particular bit is a zero compared to if the particular bit is a one. An asymmetrically weighted distance measure such as this may be useful because there is a difference between a '1' that should be a '0' and a '0' that should be a '1' in a cadence signature. For example, a bit can change to zero just by there being no motion in the content. In contrast, a one where a zero is expected requires something more significant, e.g. an error by the motion estimator.

In the examples described above, the cadence analysis module 204 uses a set of known cadences which have known cadence signatures in order to implement step S318. In other examples, there might not be a set of known cadences and the cadence analysis module 204 may select the significant peak(s) in the progressive cadence signature histogram and map these onto cadences with no knowledge of which cadences are likely. This method is likely to be less reliable than using a set of known cadences as described above but it is more flexible to detecting unusual cadences, and does not require the set of known cadences to be stored.

Therefore, following step S318 the cadence analysis module 204 has identified a set of one or more cadences of progressive content that is included in the current field, but it is not known which of the blocks of the current field have which cadence. The method may end at this point if for example, all of the blocks in the current field have progressive content and if there is only one significant cadence identified in the progressive cadence signature histogram. In that case all of the blocks of the current field can be assigned to the progressive content type having the cadence identified in step S318.

However, in other examples, it is not the case that all of the blocks of a field map to a single progressive cadence. Furthermore, it is known from step S308 whether there are any blocks of an interlaced content type or a static content type. A cadence signature of all ones (e.g. 511 for a nine-bit cadence signature) corresponds to a cadence which is indicative of an interlaced content type, whilst a cadence signature of all zeroes corresponds to a cadence which is indicative of a static content type. In step S320 a local analysis of the cadence signatures of each block in the current field is performed to assign each block to an interlaced content type, a static content type or to a progressive content type having one of the cadences that was identified as being present within the current field in step S318. That is, for each block of the current field, step S320 includes determining a respective measure of the similarity between the cadence signature of the block and each of: (i) the known cadence signatures of the known cadences of the progressive blocks identified in step S318, (ii) a cadence signature indicative of interlaced content (i.e. all ones), and (iii) a cadence signature indicative of static content (i.e. all zeroes). Then each block is assigned the cadence and/or content type which has the greatest similarity according to the determined measures of similarity. The measures of similarity may for example be Hamming distances. It is noted that if, in step S310, it was determined that the number of progressive blocks in the current field does not exceed the threshold then the method passes from step S310 to step S320 whereby the blocks are then assigned to an interlaced content type or a static content type.

The example shown in FIG. 5b shows that most of the blocks of the current field $502_9$ have a cadence signature of 82 which corresponds to a progressive content type with a cadence of 32. However, some of the blocks have a cadence signature of 0 which corresponds to a cadence of the static content type and some of the blocks have a cadence signature of 511 which corresponds to a cadence of the interlaced content type. For example, the content could be a film which has a progressive content type, but the bottom left corner of the picture may include static content and there may be some text overlaid on top of the film in the bottom right hand corner which has an interlaced type. The methods described herein allow the content types and cadences of the different regions of the current field $502_9$ to be correctly identified such that all of the blocks of the field can be correctly processed. This is an improvement over the prior art "mouse teeth" method mentioned in the background section above which encounters problems with the situation of there being multiple cadences (e.g. multiple content types) within a field. Motion estimation techniques provide motion vectors for blocks of the fields and therefore provide an elegant solution to determining the cadence and/or content type for individual blocks of a field.

Figure 1D:
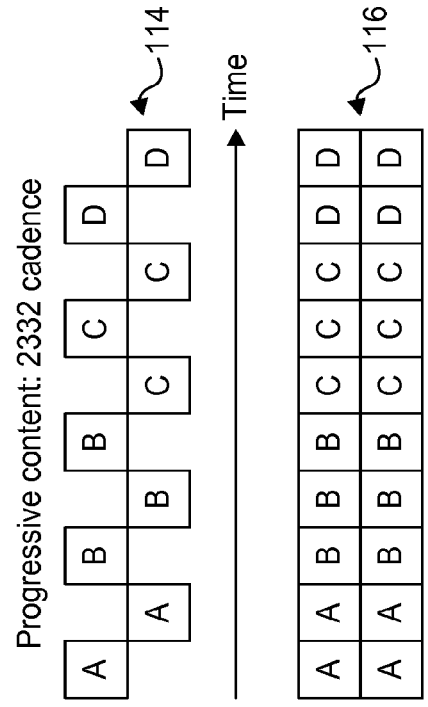
Figure 1A:
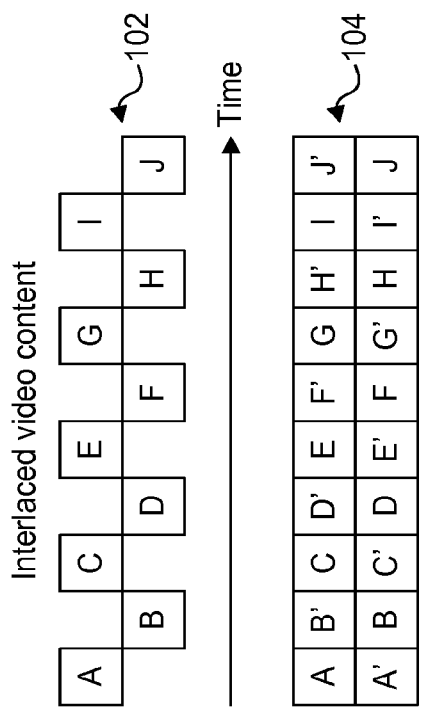
Figure 1C:
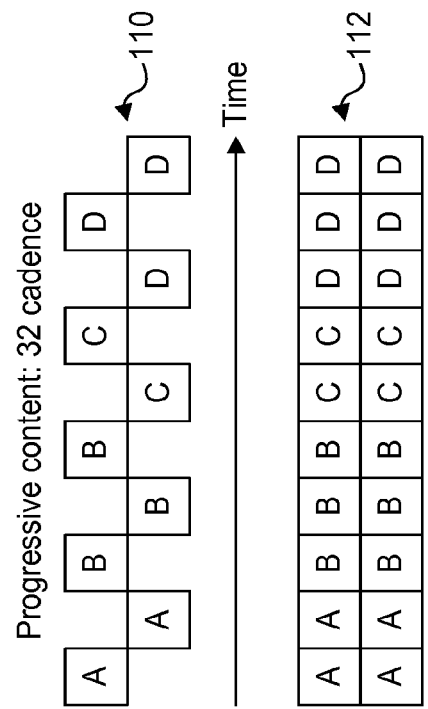
Figure 3:
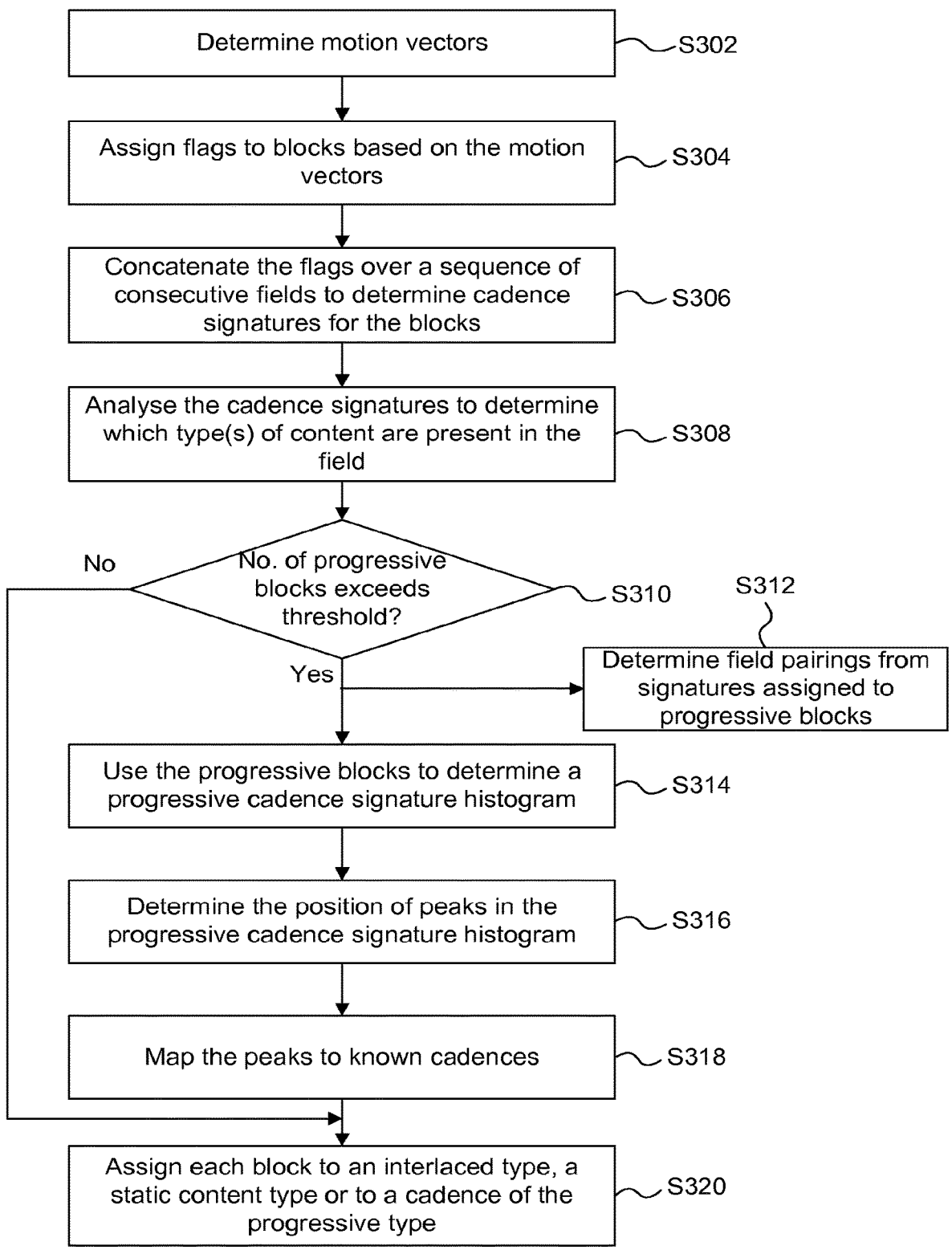
FIG. 3 shows a flow chart for a method of processing a video signal in the video processing unit.

Following the method of cadence analysis shown in FIG. 3, the results of the cadence analysis are used in the video processing unit 202 to process the video signal in accordance with the results of the cadence analysis. For example, the results of the cadence analysis (e.g. the determined field pairings and/or the determined content type and/or cadence of the content) are provided with the fields of the video signal to the frame processing module 209 which constructs the frames of the video signal accordingly. As is shown in FIG. 1a, if the results of the cadence analysis indicate that the video signal 102 includes interlaced content then the de-interlacer 210 generates the fields (e.g. A', B', C', etc.) which were not included in the video signal to thereby generate the full frames of the video content 104. However, as is shown in FIGS. 1b to 1d, if the results of the cadence analysis indicate that the video signal (e.g. 106, 110 or 114) includes progressive content with a particular cadence (e.g. 22, 32 or 2332) then the de-interlacer 210 copies some of the fields in accordance with the fields pairings to thereby generate the full frames of the video content (108, 112 or 116). If the results of the cadence analysis indicate that the video signal 102 includes static content then since the content of the fields hasn't changed (i.e. the content is static), for the purpose of this description, it doesn't matter whether the content is processed as interlaced or progressive content, and the de-interlacer 210 can copy some of the fields to generate the fields which were not included in the video signal to thereby generate the full frames of the video content.

If the results of the cadence analysis have the low confidence type then this may indicate that there are some errors in the motion estimation, and some error correction may be performed on the video signal (the details of which are outside the scope of this description). However, it can be useful to detect the low confidence content in the cadence analysis module 204 because this can avoid wasting processing resources by attempting to process the content incorrectly before determining that there are errors in the content. In particular, by identifying blocks which have the low confidence type, the detrimental impact these blocks can have on the cadence detection algorithm is limited. Some further processing of the video signal may be implemented in further processing modules 212 of the video processing unit 202 before the processed video signal is output from the video processing unit 202, but the details of the further processing that may be applied are beyond the scope of this description.

In the examples described above, a histogram is determined (in step S314) for cadence signatures of blocks of a field which are assigned to the progressive content type, in response to determining that the number of blocks in the field assigned to the progressive content type exceeds a threshold (in step S310). It will be apparent to a person skilled in the art that the concepts described above involving the use of the histogram can be applied more generally. In particular, the concept of identifying significant cadence signatures from a histogram of cadence signatures for blocks of a field may be used without necessarily determining the content type of blocks as progressive content blocks. In these more general examples, cadence signatures may be determined for blocks of a field, e.g. as described above based on the motion indicators.

For example, a cadence signature may be determined for each of the blocks of a field. A histogram can then be created for the determined cadence signatures of blocks of the field. The histogram may be created for cadence signatures of all of the blocks of the field, or for cadence signatures of a subset of the blocks of the field, e.g. for only the progressive blocks of the field as in the examples described above, or for only the blocks within a particular region of the field, or some other subset of the blocks of the field. The position of one or more peaks in the histogram can be determined to thereby determine one or more significant cadence signatures in the field. As described above, peaks in the histogram may be considered to indicate significant cadence signatures if the peaks are above a threshold. Once the significant cadence signatures have been determined, the fields of the video signal can be processed in accordance with the determined significant cadence signatures to determine frames of the video signal as described herein.

Often, many of the blocks in a field have the same cadence, so they will have similar cadence signatures (with some possible variation in the cadence signatures, e.g. due to errors). The use of a histogram allows significant (or "prevalent") cadence signatures to be determined from the blocks in the field by identifying which cadence signatures correspond to significant peaks in the histogram. This method is therefore robust to errors in the cadence signatures because errors in cadence signatures will not tend to lead to significant peaks in the histogram, such that an erroneous cadence signature will not tend to be identified as a significant cadence signature when analysing the histogram. The significant cadence signatures which are identified from the histogram may be mapped to known cadence signatures of known cadences as described above, for example by finding the smallest distance (e.g. smallest Hamming distance) between the significant cadence signature and a known cadence signature. Alternatively, a set of known cadences might not be used, and the significant cadence signatures can simply be used to identify cadences which would exhibit those significant cadence signatures. This can help to identify unusual or unexpected cadences in the video signal, which might not be included in a set of known cadences. Furthermore, if a set of known cadences is not used, there is no need to decide which cadences should be included in the set, e.g. by trying to predict which cadences are likely to occur in the video signal, and there is no need to store the set of known cadences.

In examples described above, the significant (or "prevalent") cadence signatures are determined by analysing a histogram of the cadence signatures in a field to find peaks which are above a threshold. It will be apparent to a person skilled in the art that the prevalent cadence signatures may be determined in other ways. For example, a cadence signature which occurs frequently within a region of particular interest in the field (e.g. near the centre) may be determined to be a prevalent cadence signature even if it does not occur frequently outside of the region of particular interest in the field. Irrespective of how the prevalent cadence signatures are identified from the determined cadence signatures of the blocks of the field, each of the prevalent cadence signatures can be mapped to a known cadence from a set of known cadences which have known cadence signatures by determining which of the known cadence signatures of the known cadences has a smallest distance (e.g. a smallest Hamming distance) to the prevalent cadence signature, as described above.

Figure 7:
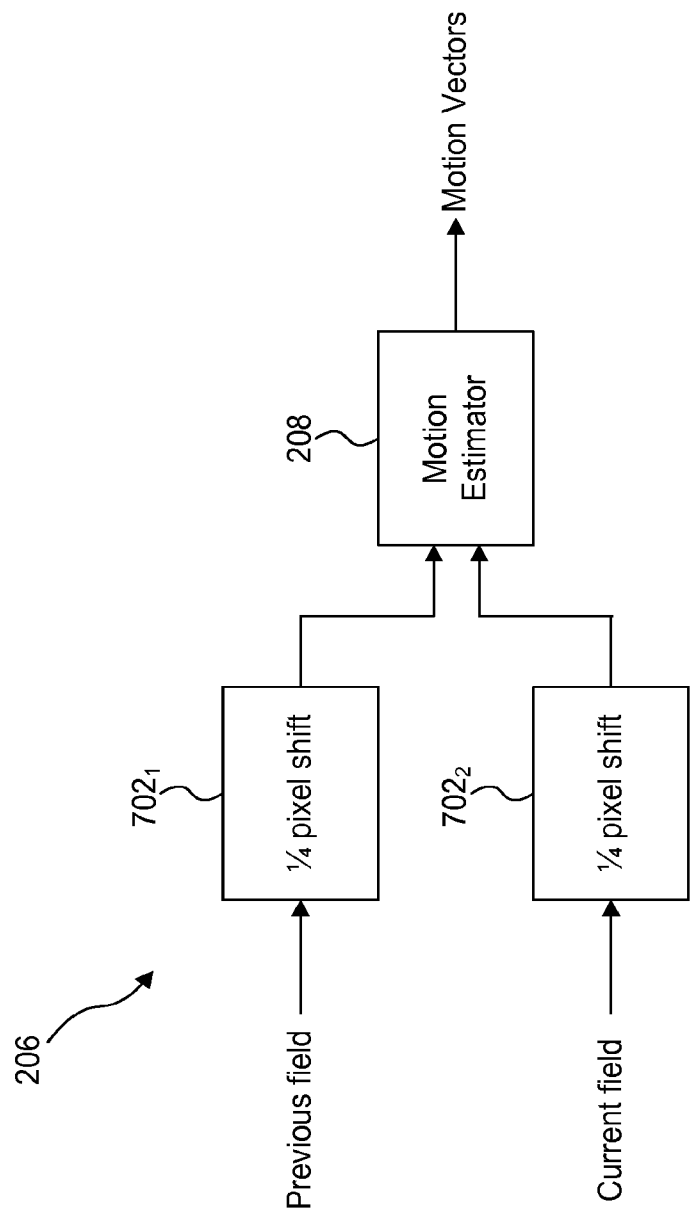
FIG. 7 is a schematic diagram of a motion estimation module in a first example.

In the examples given above there is a single motion estimator 208 in the motion estimation module 206. FIG. 7 illustrates some more details of the motion estimation module 206. The motion estimation module 206 includes the motion estimator 208, a first pixel shifting module $702_1$ and a second pixel shifting module $702_2$. The pixel shifting module $702_1$ is arranged to receive the content of a previous field, and the pixel shifting module $702_2$ is arranged to receive the content of the current field. Outputs of the two pixel shifting modules $702_1$ and $702_2$ are coupled to inputs of the motion estimator 208. The motion estimator 208 is a backward motion estimator such that it is configured to compare blocks of the current field with content from a previous (e.g. the immediately preceding) field from the video signal in order to determine a likely motion vector (referred to as a backward motion vector) describing the motion of the content between the previous field and the current field. However, since consecutive fields of the video signal relate alternately to odd and even lines of the frames of the video content the previous and current fields do not relate to the same lines of content. Therefore, before the motion estimator 208 can compare the content of the two fields, the pixel shifting module $702_1$ shifts the lines of the previous field by a quarter of a pixel of the field (i.e. half a pixel of the full frame), and the pixel shifting module $702_2$ shifts the lines of the current field, in the other direction, by a quarter of a pixel of the field (i.e. half a pixel of the full frame). The shifts may be implemented using interpolation techniques. The shifted content is then provided to the motion estimator 208. In this way, the content of the two fields provided to the motion estimator 208 are aligned so that the motion estimation can be performed correctly to determine the backward motion vectors.

Figure 8:
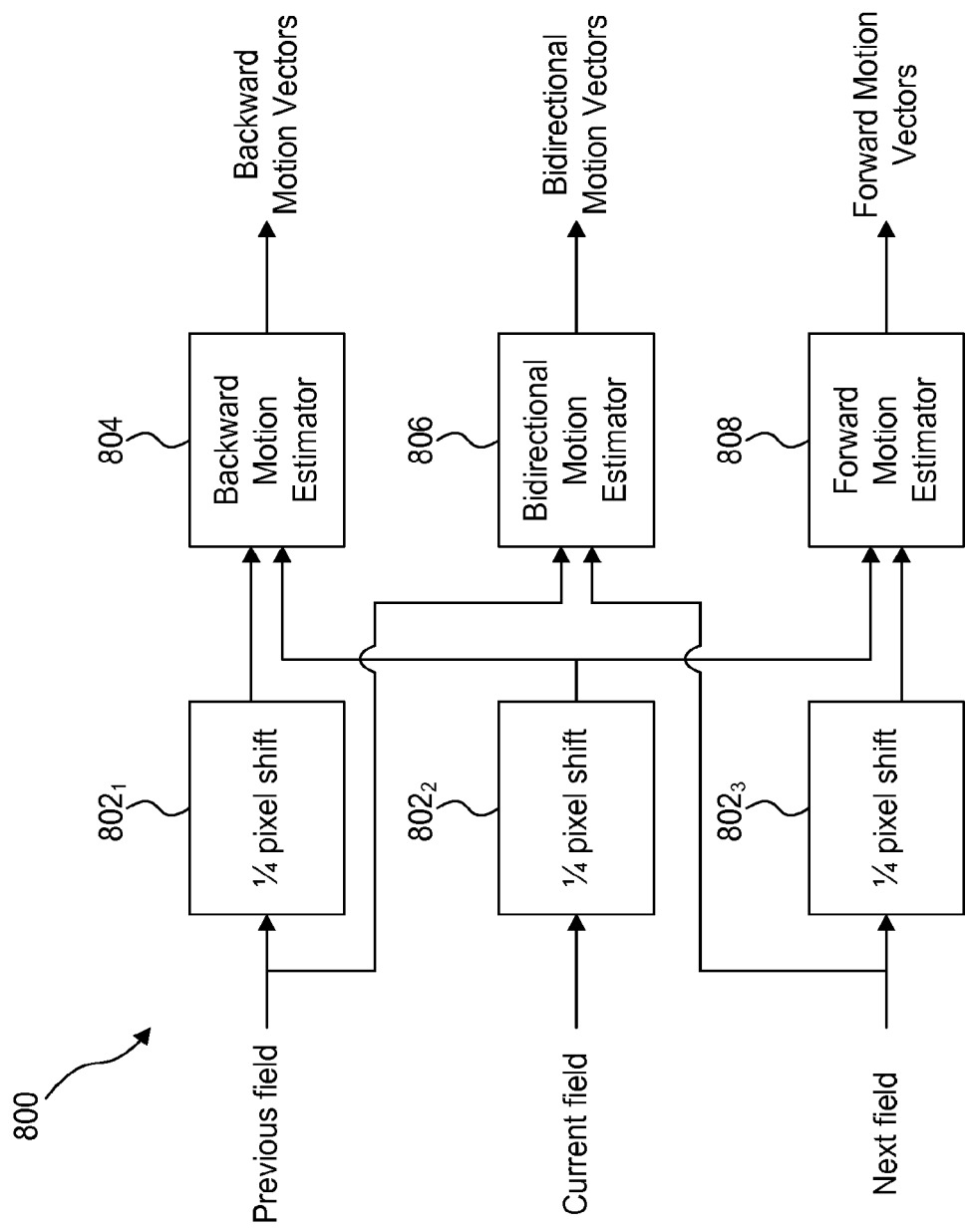
FIG. 8 is a schematic diagram of a motion estimation module in a second example.

However, as demand for improved quality continues and the resources available increase it is becoming more common to perform multiple motion estimations per block. FIG. 8 shows an example of a motion estimation module 800 which comprises: (i) a backward motion estimator 804 similar to the motion estimator 208, which is configured to generate backward motion vectors for blocks of the current field by comparing the blocks of the current field with content of the previous field; (ii) a bidirectional motion estimator 806 which is configured to generate bidirectional motion vectors for blocks of the current field by comparing content of the previous field with content of the next field; and (iii) a forward motion estimator 808 configured to generate forward motion vectors for blocks of a current field by comparing the blocks of the current field with content of the next field. The motion estimation module 800 also comprises three pixel shifting modules $802_1$, $802_2$ and $802_3$, which are arranged to apply pixel shifts respectively to the content of the previous field, the current field and the next field. As described above, the pixel shifting modules 802 shift the lines of the respective fields (e.g. by interpolation) by a quarter of a pixel of the field (i.e. half a pixel of the full frame) so that the content compared by the motion estimators is correctly aligned spatially.

The motion estimation module 800 operates such that the backward motion estimator 804 determines the backward motion vectors by comparing the shifted versions of the previous and current fields output from the pixel shifting modules $802_1$ and $802_2$. The forward motion estimator 808 determines the forward motion vectors by comparing the shifted versions of the current and next fields output from the pixel shifting modules $802_2$ and $802_3$. The bidirectional motion estimator 806 determines the bidirectional motion vectors by comparing the unshifted versions of the previous and next fields. It is noted that the previous and the next fields relate to the same lines of the frames (i.e. either odd or even lines) and as such no pixel shifting is needed to align the content before providing the fields to the bidirectional motion estimator 806.

The motion vectors from each of the motion estimators (804, 806 and 808) may be used to determine the cadence signatures for each of the blocks of the current field. That is, the different types of motion vectors are used to determine respective cadence signatures for the blocks of the current field, so in the case of a three motion estimator configuration each block in the current field may have three corresponding cadence signatures determined for it. The additional information from the increased number of motion estimators may be used to improve the robustness of the cadence analysis performed by the cadence analysis module 204. If all three motion estimators are correct then the cadence signature for a block derived from the forward motion vectors, $S_f$, is a bit-shifted version of the cadence signature of the block derived from the backward motion vectors, $S_b$. As an equation this can be written as:

$$S_b \& (2^{N-1}-1) = S_f >> 1 \quad (1)$$

where "&" represents the AND operator and ">>" represents a bit shift to the right. Furthermore, for progressive content, there should not be motion in two consecutive fields of the video signal, and as such the bits of the cadence signature for a block derived from the bidirectional motion vectors, $S_d$, will be ones unless the previous, current and next fields are all the same. As an equation this can be written as:

$$S_d = S_f | S_b \quad (2)$$

where "|" represents the OR operator.

It is described below how the different cadence signatures $S_d$, $S_f$ and $S_b$ may be used to assign blocks to one of the types: static, interlaced, progressive or low confidence. If the number of ones in the bidirectional cadence signature $S_d$ is greater than the result of $S_f | S_b$ for a block then the block may be assigned to the low confidence type because this indicates that there is an error somewhere, e.g. in the motion vectors.

If a block is not assigned to the low confidence type then the block may be assigned to a content type based on the number of bits of the cadence signatures which are ones. For example, if the number of ones in the forward or backward cadence signatures ($S_f$ or $S_b$) for a block are below a lower threshold (where, as an example, the lower threshold may be 1) then the block may be assigned to the static content type and if the number of ones in the forward or backward cadence signatures ($S_f$ or $S_b$) for a block are above an upper threshold (where, as an example, the upper threshold may be 5) then the block may be assigned to the interlaced content type.

The remaining blocks are likely to be blocks of progressive content but further checks may be performed to check that the progressive content type should be assigned to the blocks. For example, the number of times that consecutive ones are found in the forward cadence signature $S_f$ is determined and the number of times that consecutive ones are found in the backward cadence signature $S_b$ is determined. For progressive content, consecutive ones should not occur, so if the number of consecutive ones in either the forward or backward cadence signatures is greater than a threshold (e.g. 1) then the block is assigned to the low confidence type. Furthermore, a check can be performed to see whether equation 1 given above holds true, i.e. to check whether shifting the bits of the forward cadence signature to the right by one bit position does give the backward cadence signature. Equation 1 should hold true, so if it does not then the block may be assigned to the low confidence type. If both of these checks are passed then the block is assigned to the progressive content type.

It is described above how the multiple motion vectors (backward, forward and bidirectional) can be used to determine the types of content in the current field in step S308. Furthermore, the forward and backward cadence signatures ($S_f$ and $S_b$) can also be used when creating the progressive cadence signature histogram in step S314. The backward and forward cadence signatures $S_b$ and $S_f$ can be combined into a single histogram for the progressive blocks. The forward cadence signatures are shifted to the right by one bit such that the most recent bit from the forward cadence signature is discarded. In this way the bits of the shifted forward cadence signature and the corresponding bits of the backward cadence signature relate to the motion between the same pairs of fields of the video signal. The resulting progressive cadence signature histogram is used as described above in relation to a single motion estimator 208. Similarly, in step S320, each block is assigned to a content type and/or cadence based on both the forward cadence signature and the backward cadence signature of the block. Using both forward and backward cadence signatures for these steps (determined from forward and backward motion estimation respectively) increases the robustness of the cadence analysis to errors because more data is considered, thereby reducing the effect of a single error.

Furthermore, in the field pairing step (step S312), the most recent bit of the backward cadence signature can be used to determine if the current field matches the previous field in the video signal and the most recent bit of the forward cadence signature can be used to determine if the current field matches the next field in the video signal. It can therefore be appreciated that the use of multiple motion estimators in the motion estimation module 206 can provide for a more robust and accurate cadence analysis.

In the examples described above, the motion estimation module 206 is part of the video processing unit 202. FIG. 2 shows the motion estimation module 206 as separate to the cadence analysis module 204. However, in some examples, the motion estimation module 206 may be considered to be part of the cadence analysis module 204.

Furthermore, in other examples the motion estimation module could be an independent component to the video processing unit 202. That is, the motion estimation module may be separate to the video processing unit 202 and the motion vectors may be received at the video processing unit 202 (e.g. at the cadence analysis module 204) from the separate motion estimation module. For example the cadence signatures may be derived as part of a video decoder with the motion vectors estimated by an independent video encoder.

It can therefore be appreciated that there is provided a method of processing a video signal to determine cadence signatures (e.g. for use in cadence detection or the determination of field pairings) based on motion vectors for the blocks of the fields of the video signal. The fields of the video signal are to be processed (e.g. in the video processing unit 202) in accordance with the determined cadence signatures (e.g. in accordance with the detected cadences and/or in accordance with the determined field pairings) to thereby determine frames of the video signal. This provides for reliable cadence analysis which is robust to bad edits in the video signal and to video content including multiple cadences.

FIG. 2 shows the video signal being received by the cadence analysis module 204. In alternative examples, the video signal may bypass the cadence analysis module 204. This is because the cadence analysis module 204 does not actually need the video signal itself in order to determine the cadence and/or field pairings for the blocks of the video signal. As can be appreciated from the description given above, the cadence analysis is performed based on the motion vectors determined for the blocks of the fields of the video signal, without using the actual video signal itself. Therefore, provided that the video signal is provided to the motion estimation module 206 and the motion estimation module 206 provides the motion vectors to the cadence analysis module 204, the cadence analysis module 204 does not actually need to receive the video signal itself. However, in some examples, it may be simpler if the cadence analysis module 204 does receive the video signal such that it can provide it with the results of the cadence analysis for further processing, e.g. by the frame processing module 209. In this way the video signal might not be passed directly to the frame processing module 209 as shown in FIG. 2 and may instead go via the cadence analysis module 204.

In the examples described above, motion vectors are obtained (e.g. in step S302) from which the binary flags are determined (e.g. in step S304) to indicate that a block either has motion or does not have motion associated with it. In other examples, the full motion vectors might not be obtained and instead just the binary flags might be obtained since this is what the cadence analysis module 204 uses in the methods described above. That is, the cadence analysis module 204 does not need the full motion vectors to detect the cadence of the video signal and/or to determine the field pairings for the video signal. In general, the cadence analysis module 204 obtains motion indicators for the blocks of the fields, wherein the motion indicators may be motion vectors or may be binary flags which indicate whether there is substantially some motion in respective blocks or whether there is substantially no motion in the respective blocks. Furthermore, as described above, the motion estimation module 206 is just one example of a motion analysis module which could be used. In other, more general, examples, a motion analysis module may analyse motion in the video signal without actually estimating the motion (e.g. without actually determining motion vectors).

For example, a motion analysis module may perform a frame difference based analysis, or an analysis to detect the presence of mouse teeth, and the results of such motion analysis could be used for cadence analysis in a similar manner to that in which the results of the motion estimation are used in the examples described in detail herein. The motion analysis module provides indications of the motion in the fields to the cadence analysis module 204, but the precise nature of the motion indicators and the way in which they are estimated can be different in different examples. It may be particularly useful to implement the motion indicators as the binary flags (rather than the motion vectors) if the de-interlacer in the video processing unit is a motion adaptive de-interlacer, because motion adaptive de-interlacers do not necessarily implement motion estimation, so in this case the video processing unit might not include a motion estimation module. It is simpler to determine the binary flags compared to determining the motion vectors, so if the motion vectors are not going to be used in the video processing unit for purposes other than cadence analysis (e.g. when a motion adaptive de-interlacer is used) then it may be advantageous for the cadence analysis module to use the binary flags rather than the full motion vectors.

Generally, any of the functions, methods, techniques or components described above can be implemented in modules using software, firmware, hardware (e.g., fixed logic circuitry), or any combination of these implementations. The terms "module," "functionality," "component", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a video processing unit configured to perform any of the methods described herein, or for generating a video processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a video processing unit as described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of processing a video signal in a video processing unit, the video signal having an interlaced format and comprising a sequence of fields, the method comprising:
   determining cadence signatures for blocks within fields of the video signal, wherein the cadence signatures are indicative of one or more cadences of the video signal, and wherein each cadence signature is determined by processing a corresponding block from each of a sequence of consecutive fields of the video signal;
   creating a histogram of determined cadence signatures of said blocks for a field; and
   using the histogram to determine one or more significant cadence signatures in said field;
   whereby the fields of the video signal are processed in accordance with one or more determined significant cadence signatures to thereby determine frames of the video signal.

2. The method of claim 1, further comprising obtaining motion indicators for blocks of a plurality of fields of the video signal, wherein the obtained motion indicators are used to determine the cadence signatures of the blocks within fields of the video signal.

3. The method of claim 2, wherein the motion indicators are motion vectors.

4. The method of claim 2, wherein the motion indicators are binary flags, wherein the binary flag for a block in a particular field has a first binary value if there is substantially no motion in the block of the particular field, and wherein the binary flag for the block in the particular field has a second binary value if there is substantially some motion in the block of the particular field.

5. The method of claim 4, further comprising concatenating the binary flags for the block over the sequence of consecutive fields of the video signal to thereby determine a cadence signature for the block.

6. The method of claim 3, wherein the obtained motion vectors are used to determine a cadence signature for each of the blocks within the plurality of fields by assigning a binary flag to the block based on the obtained motion vector for the block.

7. The method of claim 2, wherein said obtaining the motion indicators comprises either: (i) determining the motion indicators in a motion analysis module of the video processing unit, or (ii) receiving the motion indicators which have been determined by a motion analysis module which is separate to the video processing unit.

8. The method of claim 1, wherein using the histogram to determine one or more significant cadence signatures in said field comprises determining the position of one or more peaks in the histogram for said field.

9. A video processing unit configured to process a video signal, the video signal having an interlaced format and comprising a sequence of fields, the video processing unit comprising:
   a cadence analysis module configured to:
   determine cadence signatures for blocks within fields of the video signal, wherein the cadence signatures are indicative of one or more cadences of the video signal, and wherein each cadence signature is determined by processing a corresponding block from each of a sequence of consecutive fields of the video signal;
   create a histogram of determined cadence signatures of said blocks for a field; and
   use the histogram to determine one or more significant cadence signatures in said field;
   wherein the video processing unit is configured to process the fields of the video signal in accordance with one or more determined significant cadence signatures to thereby determine frames of the video signal.

10. The video processing unit of claim 9, wherein the video signal includes video content of one or more type from a set of available video content types which have different cadences, said set of available video content types including an interlaced content type and a progressive content type, and wherein the cadence analysis module is further configured to:
use the determined cadence signatures to determine the one or more types of the video content in the video signal.

11. The video processing unit of claim 10, wherein the cadence analysis module is configured to:
determine a cadence signature for each of the blocks in said field; and
assign each of the blocks in said field to one of the video content types based on the determined cadence signature for that block.

12. The video processing unit of claim 11, wherein the cadence analysis module is further configured to:
determine the number of blocks in said field which are assigned to the progressive content type;
wherein said histogram is a histogram of the determined cadence signatures of the blocks in said field which are assigned to the progressive content type, and wherein the cadence analysis module is configured to create said histogram responsive to determining that the number of blocks in said field assigned to the progressive content type exceeds a threshold.

13. The video processing unit of claim 9, wherein the cadence analysis module is further configured to map the determined one or more significant cadence signatures to one or more cadences of the video signal.

14. The video processing unit of claim 13, wherein the one or more cadences are one or more known cadences from a set of known cadences which have known cadence signatures, and wherein the cadence analysis module is configured to map each of the one or more significant cadence signatures to a known cadence by determining which of the known cadence signatures of the known cadences has the greatest similarity with the significant cadence signature.

15. The video processing unit of claim 14, wherein the cadence analysis module is configured to determine which of the known cadence signatures of the known cadences has the greatest similarity with the significant cadence signature by determining which of the known cadence signatures of the known cadences has a smallest distance to the significant cadence signature.

16. The video processing unit of claim 15, wherein the smallest distance is a smallest Hamming distance.

17. The video processing unit of claim 11, wherein the cadence analysis module is further configured to, for each block of a particular field:
determine a respective measure of the similarity between the cadence signature of the block and each of: (i) the known cadence signatures of the known cadences, (ii) a cadence signature indicative of interlaced content, and (iii) a cadence signature indicative of static content; and
assign, to the block, the cadence or content type which has the greatest similarity according to the determined measures of similarity.

18. The video processing unit of claim 9, wherein the cadence analysis module is further configured to use the determined cadence signatures to derive field pairings of consecutive fields which relate to the same time instance of the video content.

19. The video processing unit of claim 18, wherein the motion indicators are binary flags, wherein the binary flag for a block in a particular field has a first binary value if there is substantially no motion in the block of the particular field, and wherein the binary flag for the block in the particular field has a second binary value if there is substantially some motion in the block of the particular field, and wherein the cadence analysis module is configured to derive the field pairings by finding the first binary value in the most recent elements of the cadence signatures for the blocks of a field.

20. A non-transitory computer readable storage medium having stored thereon processor executable instructions that when executed cause at least one processor to process a video signal in a video processing unit, the video signal having an interlaced format and comprising a sequence of fields, the processing of the video signal comprising:
determining cadence signatures for blocks within fields of the video signal, wherein the cadence signatures are indicative of one or more cadences of the video signal, and wherein each cadence signature is determined by processing a corresponding block from each of a sequence of consecutive fields of the video signal;
creating a histogram of determined cadence signatures of said blocks for a field; and
using the histogram to determine one or more significant cadence signatures in said field;
wherein the fields of the video signal are to be processed in accordance with one or more determined significant cadence signatures to thereby determine frames of the video signal.

* * * * *